F. VALEUR.
APPARATUS FOR REMOVING DUST FROM EXHAUST GASES.
APPLICATION FILED APR. 10, 1914.
1,113,848.
Patented Oct. 13, 1914.
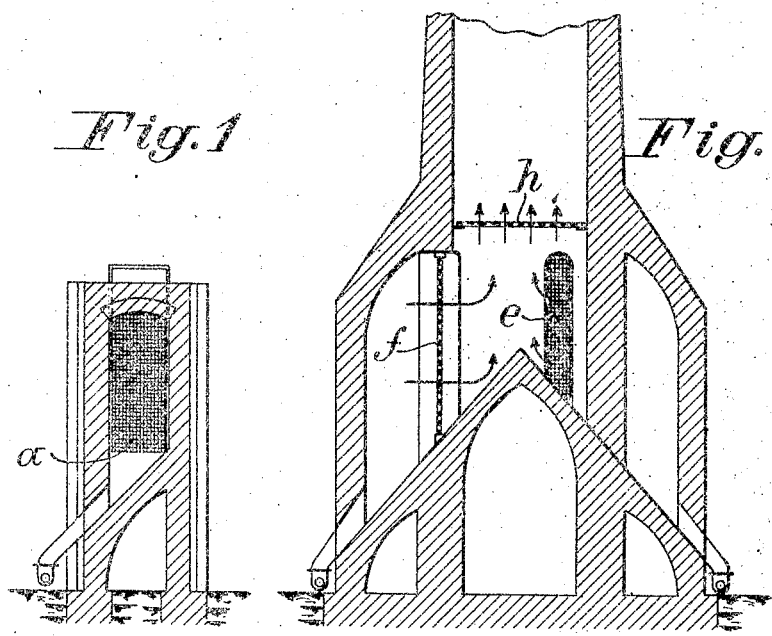
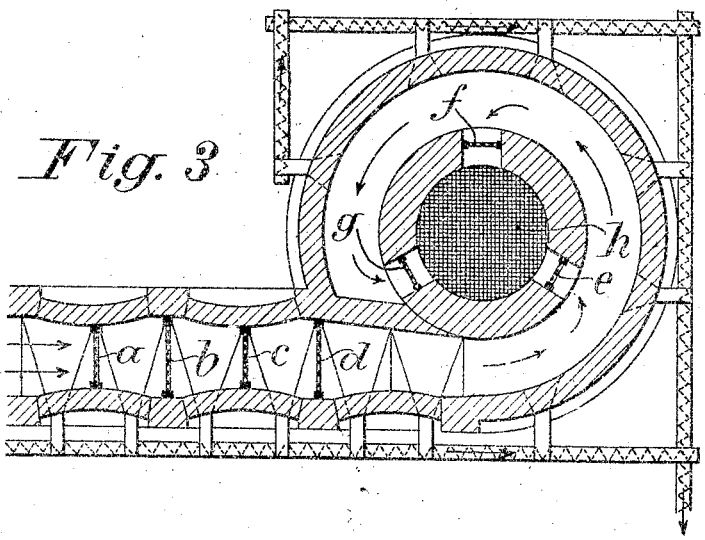

UNITED STATES PATENT OFFICE.

FREDRIK VALEUR, OF GMUNDEN, AUSTRIA-HUNGARY.

APPARATUS FOR REMOVING DUST FROM EXHAUST-GASES.

1,113,848.

Specification of Letters Patent. Patented Oct. 13, 1914.

Application filed April 10, 1914. Serial No. 831,007.

*To all whom it may concern:*

Be it known that I, Dr. FREDRIK VALEUR, subject of the Emperor of Germany, residing at Gmunden, Austria-Hungary, have invented certain new and useful Improvements in Apparatus for Removing Dust from Exhaust-Gases, of which the following is a specification.

Practically every manufacturing plant in which, as a result of the drying, grinding, roasting or burning of materials of any kind, dust is formed and along with exhaust gases is led to a chimney, has recourse to the building of a large dust collector, to prevent, as far as possible, the escape of the dust into the open air and the consequent complaints and claims for damage from the neighbors. But the building of such a collector is very limited, as much on account of the amount of space taken as on account of the cooling of the exhaust gases with the corresponding reduction of the chimney pull. On this account the dust collector is successful in removing only a small part of the dust from the exhaust gases, by far the greater part of which escapes into the atmosphere.

The object of the present invention is an apparatus by means of which this disadvantage can be overcome at small cost.

In view of the fact that the dust removing capacity of a dust collector is due to the gases passing on their way to the chimney, through a chamber of large cross section in which they can expand, whereby they lose their velocity, with the further result that a part of the dust suspended therein precipitates or settles down on the ground, it became the object of the present invention to provide means to increase this precipitation to the highest possible degree. This the present invention has now accomplished.

It consists essentially in means whereby the dust collector, or the flue or duct or the chimney, is divided into a number of separate compartments in which the velocity of the passing gases throughout the entire area of each compartment is uniformly reduced. The invention provides at the same time a means of regulating the velocity of the passing gases according to requirements and thereby of continually maintaining the operation of the plant at a maximum efficiency.

The uniform reduction of the velocity of the gases throughout the whole area of the dust collector or the chimney is accomplished by means of a frame of the size of the cross-sectional area of the collector or the chimney containing a gauze screen or network of iron or other material fixed in the dust collector, the flue or duct, or the chimney. By means thereof the cross-sectional area of the dust collector, flue or chimney is reduced at that point by the sum of that of the wires forming the screen, and, correspondingly, the velocity of the gases in front of the frame is reduced. Behind the frame the chimney pulls the gases forward with the original power. If there is now placed at a certain distance behind the first frame, say at a distance of from once to twice the width of the dust collector or flue, a second frame, and behind the second frame a third, and so on, up to the entrance of the gases into the chimney, and if in the chimney itself valves or dampers are arranged which also are formed with a gauze or network of metal and which extend entirely across the chimney, the velocity of the gases in the entire space between the first and last frame is considerably, and if all the frames are filled with gauze of similar mesh, uniformly reduced.

By using gauze of varying mesh, it is possible to obtain any desired degree of velocity of the gases, and to reduce it to such a point as suits best the operation of the drying drum, roasting or combustion furnace or the like. Accordingly the gauze of the screens toward the end of the dust collector or flue and in the chimney should always be of finer mesh.

For continuously securing a uniform velocity of the gases in the dust collector, it is preferable to provide apparatus which connects together all the screens in the dust collector and which is capable of giving at definite short intervals to one frame after the other a short jerk or impact to free it from any adhering dust. Such apparatus are known and need not be described here.

In the drawing i illustrated an embodiment of the apparatus above described.

Figures 1 and 2 are vertical sections throughout the exhaust flue and chimney, and Fig. 3 is a horizontal section.

The dust conveying exhaust gases enter the exhaust flue at *a* and pass successively through the screens *a, b, c, d, e, f, g*, and then escape through the chimney into the atmosphere. The collected dust is then led back into the factory in some suitable manner by a screw or other conveyer.

I claim—

In an apparatus for separating and collecting dust from exhaust gases, the combination of a chimney; a horizontal flue opening tangentially thereinto; and a plurality of framed, vertical, screens built into said flue throughout the entire length thereof, in spaced, parallel relation to one another and occupying the entire cross-sectional area of said flue, said screens dividing the interior of the flue transversely into separate compartments, to contract the cross-sectional area of the said flue at the points where the screens are located, whereby the gases passing through the flue are momentarily condensed in front of each screen and their velocity momentarily reduced, to permit the dust to precipitate in said compartments.

In testimony whereof I have hereunto set my hand in presence of two subscribing witnesses.

Dr. FREDRIK VALEUR.

Witnesses:
 Josef Richards,
 August Fugger.